(12) United States Patent
Roberts (10) Patent No.: US 12,435,594 B2
(45) Date of Patent: Oct. 7, 2025

(54) BORE SELECTOR

(71) Applicant: Enovate Systems Limited, Aberdeenshire (GB)

(72) Inventor: Ibiye Roberts, Aberdeenshire (GB)

(73) Assignee: ENOVATE SYSTEMS LIMITED, Aberdeen (GB)

( * ) Notice: Subject to any disclaimer, the term of this patent is extended or adjusted under 35 U.S.C. 154(b) by 0 days.

(21) Appl. No.: 18/835,876

(22) PCT Filed: Feb. 6, 2023

(86) PCT No.: PCT/GB2023/050253
§ 371 (c)(1),
(2) Date: Aug. 5, 2024

(87) PCT Pub. No.: WO2023/148505
PCT Pub. Date: Aug. 10, 2023

(65) Prior Publication Data
US 2025/0146375 A1 May 8, 2025

(30) Foreign Application Priority Data
Feb. 7, 2022 (GB) .................................. 2201553

(51) Int. Cl.
*E21B 33/038* (2006.01)
*E21B 17/01* (2006.01)
*E21B 23/00* (2006.01)

(52) U.S. Cl.
CPC ............ *E21B 33/038* (2013.01); *E21B 17/01* (2013.01)

(58) Field of Classification Search
CPC ........ E21B 33/038; E21B 17/01; E21B 34/20; E21B 23/00; E21B 43/013
(Continued)

(56) References Cited

U.S. PATENT DOCUMENTS 3,482,601 A * 12/1969 Drouin .................... F16L 41/02
166/344
3,834,418 A * 9/1974 Clancy ................ F16K 11/0655
137/625.48
(Continued)

FOREIGN PATENT DOCUMENTS

| CA | 2250228 | 10/2005 |
| GB | 2258675 | 2/1993 |
| WO | 2023148505 | 8/2023 |

OTHER PUBLICATIONS

International Search Report and Written Opinion dated Mar. 31, 2023 for International Application No. PCT/GB2023/050253.

*Primary Examiner* — Nicole Coy
*Assistant Examiner* — Douglas S Wood
(74) *Attorney, Agent, or Firm* — Jeffrey D. Frantz (57) ABSTRACT

A bore selector for use with a monobore riser and a multibore subsea system having a production bore and an annulus bore. The bore selector has a housing extending in a longitudinal direction and a bore selector element rotatably mounted to the housing and is rotatable about an axis which extends substantially transverse to the longitudinal direction. The bore selector element may comprise a ball element, or a cylindrical element. The bore selector element has a first passage extending through the bore selector element and is configured to connect the monobore riser to the production bore at a first rotational position of the bore selector element, and a second passage extending through the bore selector element and is configured to connect the monobore riser to the annulus bore at a second rotational position of the bore selector element. The first and second passages may intersect within the bore selector element.

25 Claims, 10 Drawing Sheets

(58) Field of Classification Search
USPC .......................................................... 166/367
See application file for complete search history.

(56) References Cited

U.S. PATENT DOCUMENTS

| | | | | |
|---|---|---|---|---|
| 4,223,700 | A * | 9/1980 | Jones | E21B 23/12 |
| | | | | 406/182 |
| 4,291,724 | A * | 9/1981 | Miller | E21B 33/0387 |
| | | | | 166/70 |
| 5,377,762 | A * | 1/1995 | Turner | E21B 23/12 |
| | | | | 166/347 |
| 6,170,578 | B1 * | 1/2001 | Edwards | E21B 33/035 |
| | | | | 166/359 |
| 6,561,276 | B2 * | 5/2003 | Hamilton | E21B 33/076 |
| | | | | 166/341 |
| 8,393,404 | B2 * | 3/2013 | Ingraham | E21B 23/12 |
| | | | | 166/241.1 |
| 8,881,828 | B2 * | 11/2014 | Strand | E21B 33/038 |
| | | | | 166/344 |
| 10,066,458 | B2 * | 9/2018 | Deacon | E21B 34/045 |
| 2009/0223671 | A1 * | 9/2009 | Edwards | E21B 33/076 |
| | | | | 166/344 |
| 2014/0209314 | A1 * | 7/2014 | Guven | E21B 33/063 |
| | | | | 166/336 |
| 2015/0176353 | A1 | 6/2015 | Edwards | |

\* cited by examiner

BORE SELECTOR

RELATED APPLICATIONS

This application is a U.S. National Stage Application filed under 35 USC 371, claiming priority to Serial No. PCT/GB2023/050253 filed on 6 Feb. 2023; which claims priority from Great Britain Application No. 2201553.1, filed 7 Feb. 2022, the entireties of which are hereby incorporated herein by reference.

TECHNICAL FIELD

The present invention relates to a bore selector for use with a monobore riser and a multi-bore subsea system, and apparatus comprising said bore selector.

BACKGROUND

Conventional multi-bore subsea wells comprise a production bore and a smaller annulus bore. The production bore and annulus bore are defined in the tubing and corresponding production and annulus bores extend through the Christmas tree mounted on the subsea well for control of fluid flows in the production bore and annulus bore. During installation and/or well intervention operations, for example, it is necessary to be able to insert a tool into the production bore or the annulus bore. To avoid the need for a multi-bore riser it is known to provide a bore selector within the well intervention string. The bore selector can be used to guide a tool either into the production bore or into the annulus bore.

US 2015/176353 discloses an example of a known bore selector for use with a dual bore subsea system. The bore selector of US 2015/176353 has pair of rams having a ram head defining parts of a guide funnel are hydraulically actuatable, so that when the rams are actuated and closed, the guide funnel is formed which couples a part of the production bore to the annulus bore.

US6170578B1 discloses a bore selector having a rotatable ball-like valve element having an aperture such that rotation of the ball-like valve element directs a tool either into the production bore or into the annulus bore.

It may be an object of one or more aspects, examples, embodiments, or claims of the present disclosure to at least mitigate or ameliorate one or more problems associated with the prior art.

SUMMARY

According to a first aspect of the invention, there is provided a bore selector for use with a monobore riser and a multi-bore subsea system having a production bore and an annulus bore, the bore selector comprising:
 a housing extending in a longitudinal direction, and
 a bore selector element rotatably mounted to the housing and rotatable about an axis extending substantially transverse to the longitudinal direction, the bore selector element comprising:
  a first passage extending through the bore selector element and configured to connect the monobore riser to the production bore at a first rotational position of the bore selector element, and
  a second passage extending through the bore selector element configured to connect the monobore riser to the annulus bore at a second rotational position of the bore selector element.

Each of the first passage and the second passage may comprise a first opening and a second opening formed in a surface of the bore selector element. Preferably, the first and second passages are distinct. In some embodiments, each of the first and second passages may intersect within the bore selector element.

The bore selector may further comprise a first connector for connection to the monobore riser, and a monobore adapter disposed between the bore selector element and the first connector. The first connector may be attachable directly to the monobore riser, or it may be connectable to the monobore riser via one or more intermediate assemblies, forming part of the intervention string.

In some embodiments, the monobore adapter defines a portion of a seat within which the bore selector element is rotatable.

The bore selector device may further comprise a second connector for connection to the multi-bore subsea system, and a bore isolator disposed between the bore selector element and the second connector. The second connector may be attachable directly to a multi-bore subsea well (e.g. by using a running tool), or it may be connectable to the multi-bore subsea well via one or more intermediate assemblies.

In some embodiments, the bore isolator is exchangeable such that the bore selector can be configured for different multi-bore subsea systems. An advantage of this embodiment is that the bore selector can be used for a wide range of bore spacings and tool string lengths simply by changing the bore isolator. In contrast, previous bore selectors have been specific to a designated bore spacing.

The bore isolator may comprise a production bore passage for connection to the production bore, and an annulus bore passage for connection to the annulus bore. Preferably, the production bore passage and the annulus bore passage are separate. Said another way, the production bore passage and the annulus bore passage do not intersect. As such, the production bore passage and annulus bore passage provide separate paths to the production bore and annulus bore through the bore isolator.

The bore isolator may define a portion of a seat within which the bore selector element is rotatable.

In some embodiments, rotation of the bore selector element may be configured to shear wireline tool strings between the bore selector element and the monobore adapter and/or bore isolator. The bore selector element may comprise a hardened material, for example hardened steel. Edges of the bore selector element that form the openings into the first and second passages may be angled to provide a cutting or shearing edge. An advantage of using the bore selector element to shear wireline media is that the bore selector removes the need for a separate shearing device above (or below) the bore selector in the landing string.

The bore selector element may comprise a ball element. An advantage of this embodiment is that the seat within which the ball element sits does not need a fixed orientation relative to the rotatable ball element. In alternative embodiments, the bore selector element may comprise a cylindrical element.

The bore selector may comprise an actuator configured to rotate the bore selector element. Preferably the actuator comprises a scotch-yoke mechanism. In some embodiments, the actuator comprises a hydraulic piston. In alternative embodiments, the actuator may be an electric actuator, for example an electric motor arranged to rotate the bore selector element. In other embodiments, an electric linear actuator may be provided with the scotch-yoke mechanism to rotate the bore selector element. Advantageously, an actuator having a scotch-yoke mechanism can be adapted to fit within the inner diameter of a cylindrical housing of the bore selector, allowing the bore selector to be deployed into or through another tubular passage such as a monobore riser. In further embodiments, the bore selector element may be rotatable by a remotely operated vehicle (ROV).

Preferably, the actuator is pressure balanced. Advantageously, should control of the device be lost, the device will fail in position as the bore pressure will not move the bore selector element. In other embodiments, the actuator may be spring-loaded to fail safe to a pre-defined bore position.

In embodiments, a circulation sub-assembly may be provided. The circulation sub-assembly may be connectable between the bore selector element and the multi-bore subsea system. The circulation sub-assembly may interface with a tubing hanger running tool. An advantage of providing the circulation sub-assembly is that the sub-assembly has additional capacity of providing a circulation return line back to the surface via annulus isolation valves. The circulation sub-assembly could be configured with plug profiles or valves to enable isolation of either bore, to suit operational requirements for example, well circulation, cementing and the like.

An outer diameter of the bore selector may be at most 18.5 inches (0.47 m). Advantageously, the outer diameter of the bore selector is smaller than the typical marine riser or blow out preventor (BOP) inside diameters of 18.75 inches (0.48 m) in order to maximise operational running and retrieval options. Advantageously, if the bore selector has an actuator with a scotch-yoke mechanism then no part of the bore selector extends out from the housing of the bore selector. This means that the maximum width of the bore selector is the diameter of the housing, which can be adapted to fit within another tubular passage such as the marine riser or BOP.

According to a further aspect of the invention, there is provided apparatus for connection to a subsea well, the apparatus comprising a monobore riser system comprising a monobore riser, and a bore selector according to the first aspect of the invention.

The bore selector may be received within the monobore riser system and may be connected to the monobore riser.

The apparatus may be a well intervention apparatus. In other embodiments, the apparatus may be a well plug and abandonment apparatus. In embodiments, the apparatus may be well installation apparatus.

The invention includes one or more corresponding aspects, embodiments or features in isolation or in various combinations whether or not specifically stated (including claimed) in that combination or in isolation. For example, it will readily be appreciated that features recited as optional with respect to the first aspect may be additionally applicable with respect to the other aspects without the need to explicitly and unnecessarily list those various combinations and permutations here (e.g. the apparatus or device of one aspect may comprise features of any other aspect). Optional features as recited in respect of a method may be additionally applicable to an apparatus or device; and vice versa.

In addition, corresponding means for performing one or more of the discussed functions are also within the present disclosure.

The above summary is intended to be merely exemplary and non-limiting.

Various respective aspects and features of the present disclosure are defined in the appended claims.

It may be an aim of certain embodiments of the present disclosure to solve, mitigate or obviate, at least partly, at least one of the problems and/or disadvantages associated with the prior art. Certain embodiments may aim to provide at least one of the advantages described herein.

BRIEF DESCRIPTION OF THE DRAWINGS

An embodiment of the invention will now be described by way of example only and with reference to the accompanying drawings, in which.

DETAILED DESCRIPTION

Figure 1:
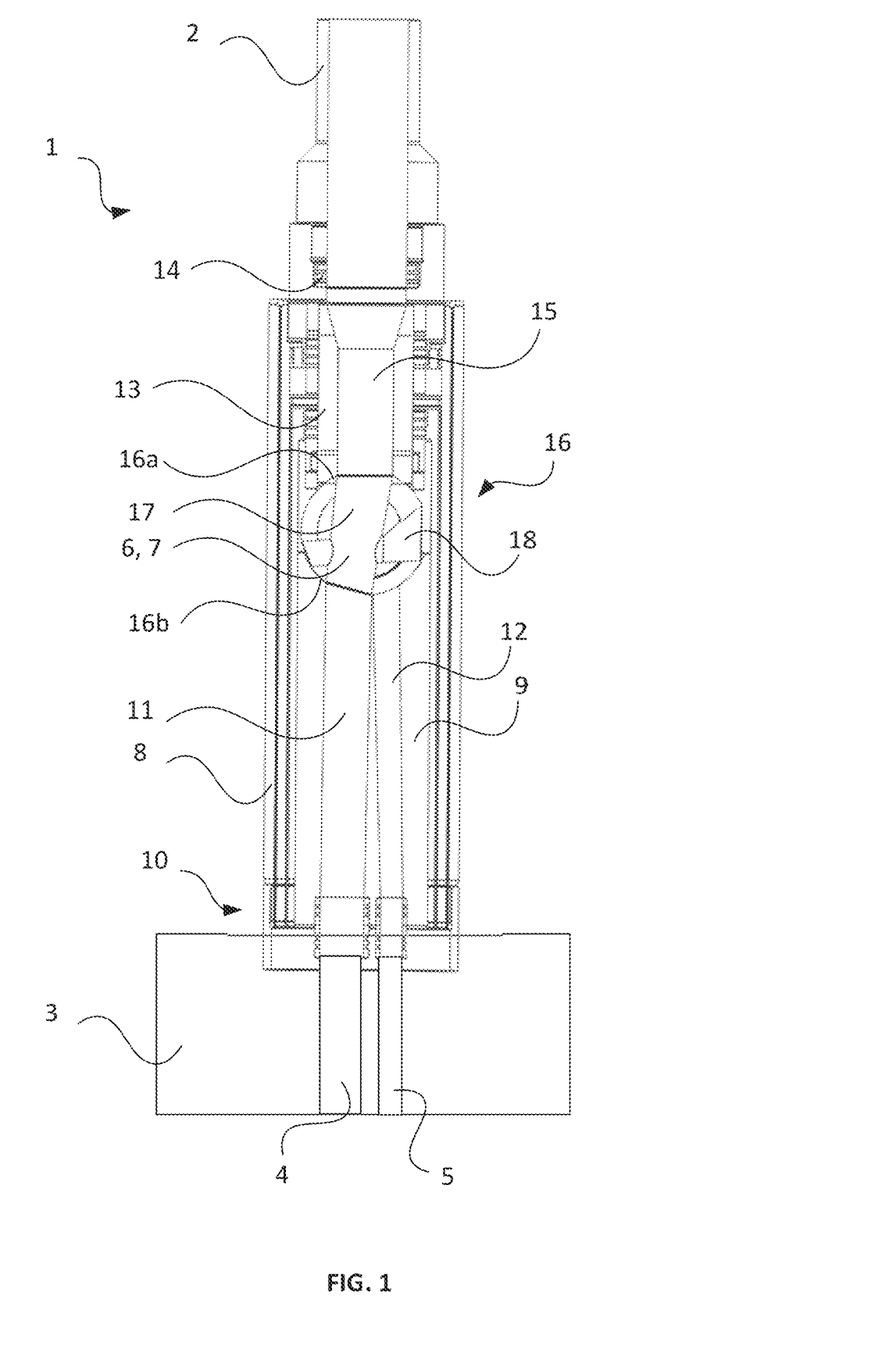
FIG. 1 shows a longitudinal sectional view of a bore selector wherein the production bore is selected.
Figure 2:
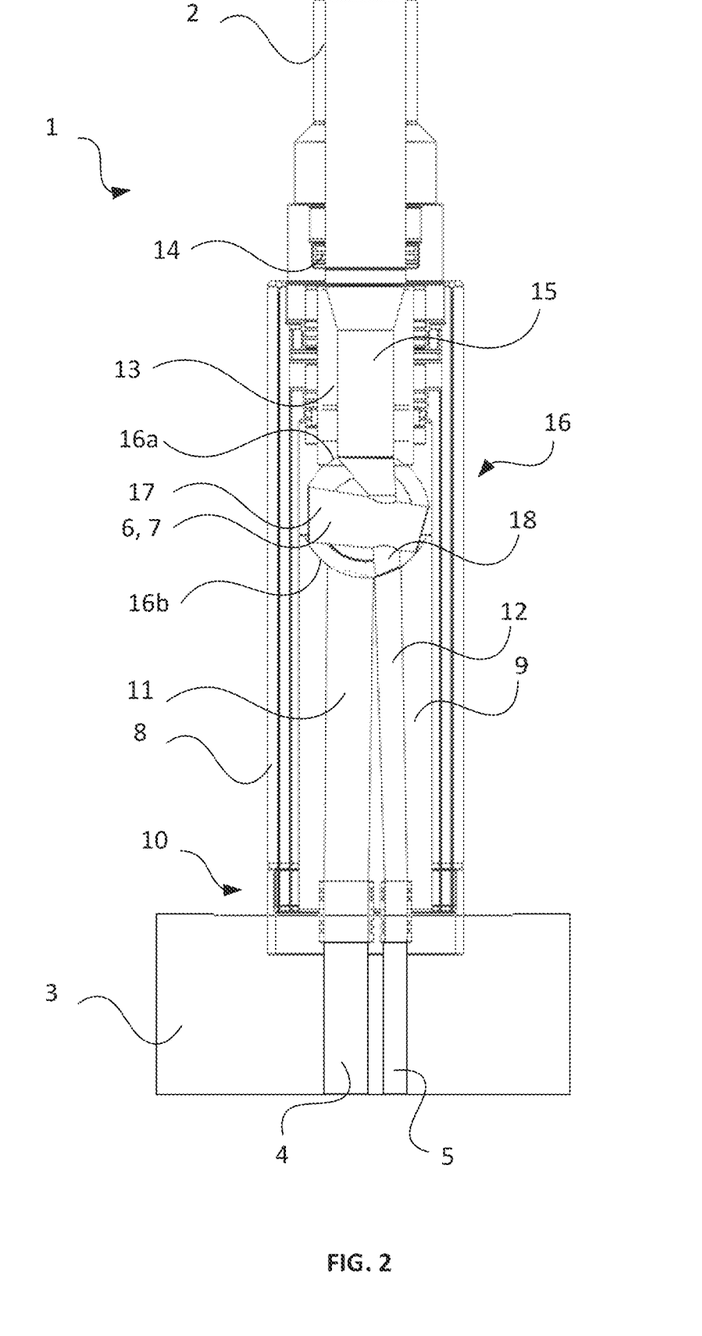
FIG. 2 shows a longitudinal sectional view of a bore selector wherein the annulus bore is selected.

Referring to FIGS. 1 and 2, there is shown a longitudinal sectional view of a bore selector 1 according to an embodiment of the present invention. The bore selector 1 can be used to connect a monobore riser system 2 (partially shown) above, with a multi-bore well system 3 (schematically shown) below. In particular, the bore selector 1 may couple between a monobore riser and a running tool (and/or other intermediate assembly) for connection to a multi-bore well. The multi-bore well system 3 includes a production bore 4 and an annulus bore 5.

The bore selector 1 comprises a rotatable bore selector element 6, in this example a ball element 7. The ball element 7 can be rotated to connect the monobore riser 2 to either the production bore 4 or the annulus bore 5 of the multi-bore well system 3, allowing well operations to be performed in the selected bore. In particular, the bore selector 1 allows well installation, well intervention or plug and abandonment operations to be performed in the selected bore.

As illustrated, the bore selector 1 has a housing 8 that extends in a longitudinal direction. The longitudinal direction is in generally the same direction as the monobore riser 2. The ball element 7 is rotatably mounted within the housing 8. The ball element 7 is rotatable about an axis that is substantially perpendicular to the longitudinal direction of the housing 8. In the illustration of FIG. 1 the rotational axis of the ball element 7 is perpendicular to the plane of the image.

Below the ball element 7, between the ball element 7 and the multi-bore well system 3, the bore selector 1 includes a bore isolator 9. The bore isolator 9 and/or the housing 8 is connectable by a connector 10 provided at the distal end of the bore selector 1 to the multi-bore well system 3, for example via an intermediate assembly such as a running tool, subsea test tree, multi-bore Christmas tree and the like. The connector 10 may comprise a standard or generic connector for subsea equipment. In various examples, and depending on the operation being performed, the connector 10 may be configured to be connected to a subsea test tree, a Christmas tree or a running tool.

The bore isolator 9 comprises a production bore passage 11 and an annulus bore passage 12. The production bore passage 11 extends from the ball element 7 to the connector 10 and connects to the production bore 4 of the multi-bore well system 3. Similarly, the annulus bore passage 12 extends from the ball element 7 to the connector 10 and connects to the annulus bore 5 of the multi-bore well system 3. As illustrated, the production bore passage 11 and annulus bore passage 12 diverge between the ball element 7 and the connector 10 to match the bore spacing between the production bore 4 and annulus bore 5 in the multi-bore well system 3.

The bore selector 1 also includes a monobore adapter 13 positioned above the ball element 7, between the ball element 7 and a connector 14 for connecting to the monobore riser 2. The monobore adapter 13 and/or the housing 8 is connectable by the connector 14 to the monobore riser 2. The monobore adapter 13 includes a passage 15 configured to align with the monobore riser 2 and the ball element 7. The connector 14 may be a standard or generic connector for subsea equipment. In various examples, and depending on the operation being performed, the connector 14 may be configured to be connected directly to the monobore riser 2, or to other equipment in the intervention riser string.

The ball element 7 is rotationally mounted in a seat 16 formed between the bore isolator 9 and the monobore adapter 13. The seat 16 is shaped to match the ball element 7, so defines a substantially spherical seat in which the ball element 7 is restrained. A first part 16a of the seat 16 is defined by the monobore adapter 13, which includes a partly concave spherical recess shaped to match the ball element 7. The passage 15 of the monobore adapter 13 extends from the first part 16a of the seat 16. A second part 16b of the seat 16 is defined by the bore isolator 9, which includes a partly concave spherical recess shaped to match the ball element 7. The production bore passage 11 and annulus bore passage 12 of the bore isolator 9 both extend from the second part 16b of the seat 16.

The ball element 7 comprises a first passage 17 and second passage 18. Each of the first and second passages 17, 18 extend through the ball element 7. As illustrated in FIG. 1, in a first rotational position of the ball element 7 the first passage 17 aligns with the passage 15 of the monobore adapter 13 at the top and with the production bore passage 11 of the bore isolator 9 underneath. As illustrated in FIG. 2, in a second rotational position of the ball element 7 the second passage 18 aligns with the passage 15 of the monobore adapter 13 at the top and with the annulus bore passage 12 of the bore isolator 9 underneath. In this way, the ball element 7 can be rotated to select which of the production bore 4 and annulus bore 5 is connected to the monobore riser 2.

As shown in FIGS. 1 and 2, in each of the first and second rotational positions the non-selected passage in the bore isolator 9 is blocked by the ball element 7. In particular, as shown in FIG. 1 when the production bore 4 is selected the annulus bore passage 12 in the bore isolator 9 is closed by the ball element 7. Similarly, as shown in FIG. 2, when the annulus bore 5 is selected the production bore passage 11 in the bore isolator 9 is closed by the ball element 7. Accordingly, the production bore 4 and annulus bore 5 are isolated from each other.

Figure 3A:
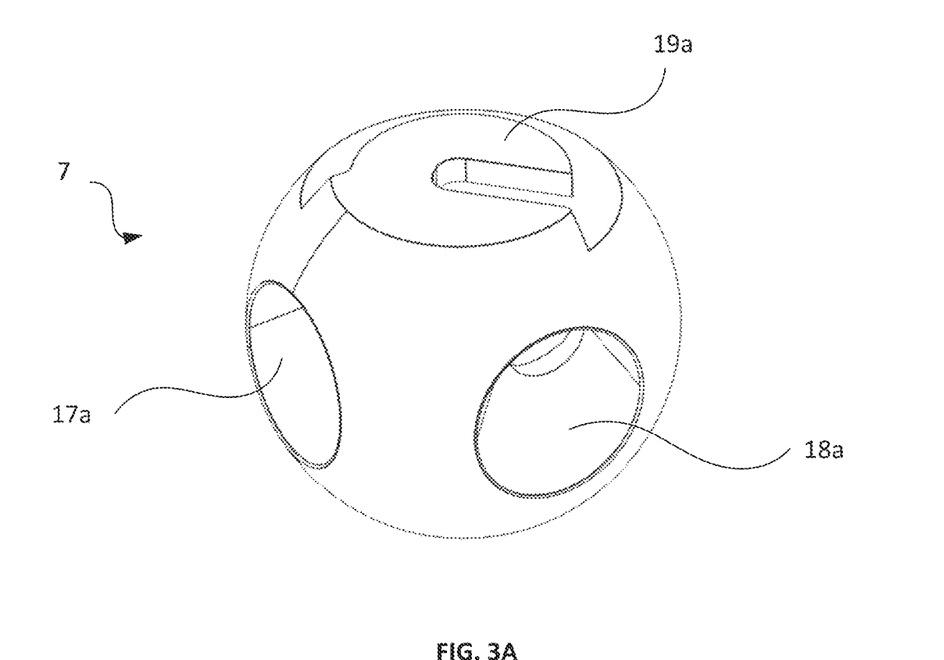
FIGS. 3A-3B depict a substantially spherical bore selector element for use in the bore selector.
Figure 3B:
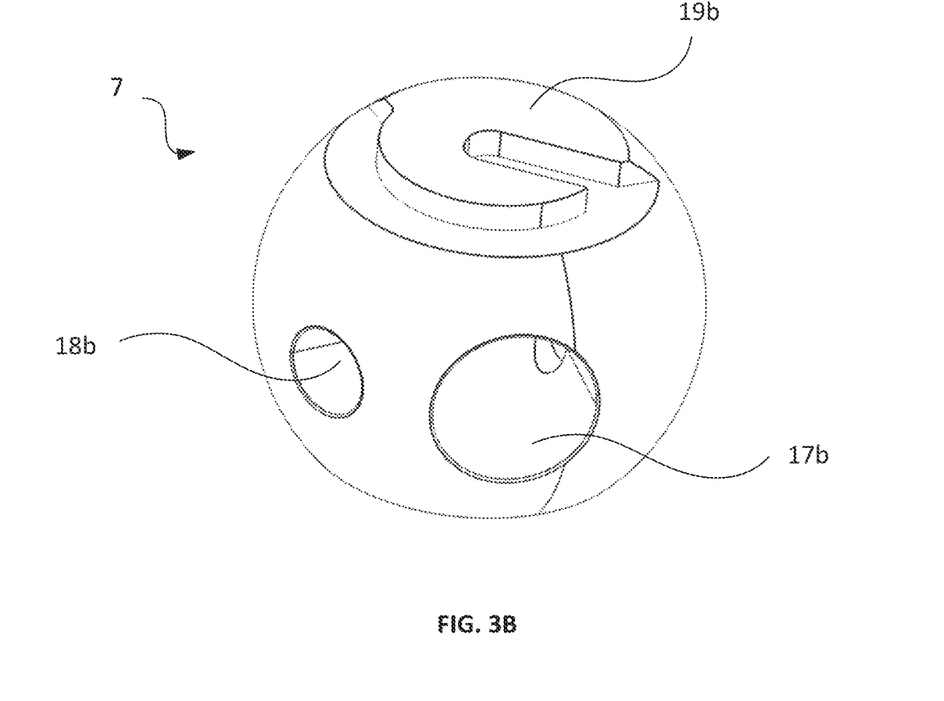

FIGS. 3A and 3B show the ball element 7 of the bore selector 1 in isolation. FIGS. 3A and 3B show opposite sides of the ball element 7. As illustrated, the ball element 7 is substantially spherical and the first and second passages 17, 18 extend through the ball element 7. In particular, the first passage 17 extends from a first opening 17a sized to match the passage (15, see FIGS. 1 and 2) in the monobore adapter (13, see FIGS. 1 and 2) to a second opening 17b sized to match the production bore passage (11, see FIGS. 1 and 2) in the bore isolator (9, see FIGS. 1 and 2). Similarly, the second passage 18 extends from a first opening 18a sized to match the passage (15, see FIGS. 1 and 2) in the monobore adapter (13, see FIGS. 1 and 2) to a second opening 18b sized to match the annulus bore passage (12, see FIGS. 1 and 2) in the bore isolator (9, see FIGS. 1 and 2).

As also shown, the ball element 7 has flattened sides 19a, 19b formed on opposite sides of the ball element 7. As detailed below, the flattened sides 19a, 19b of the ball element 7 are rotatably mounted in the housing (8, see FIGS. 1 and 2) and an actuator is provided to rotate the ball element 7.

As illustrated in FIGS. 1 to 3B, the first and second passages 17, 18 each extend through the ball element 7. The first and second passages 17, 18 are distinct, but they intersect within the ball element 7.

Figure 4A:
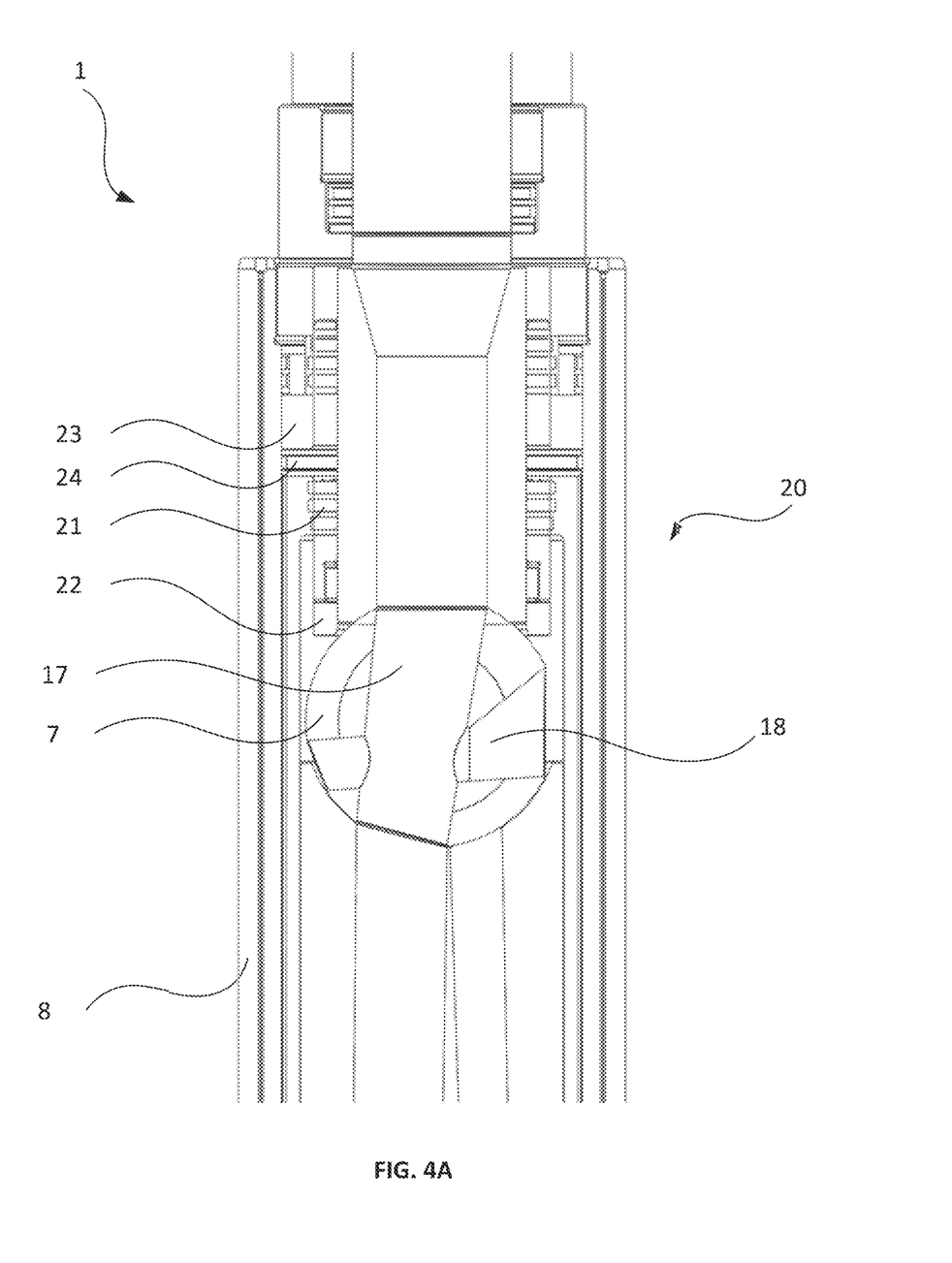
FIGS. 4A to 4B show perpendicular sectional views of an actuator for use in the bore selector.
Figure 4B:
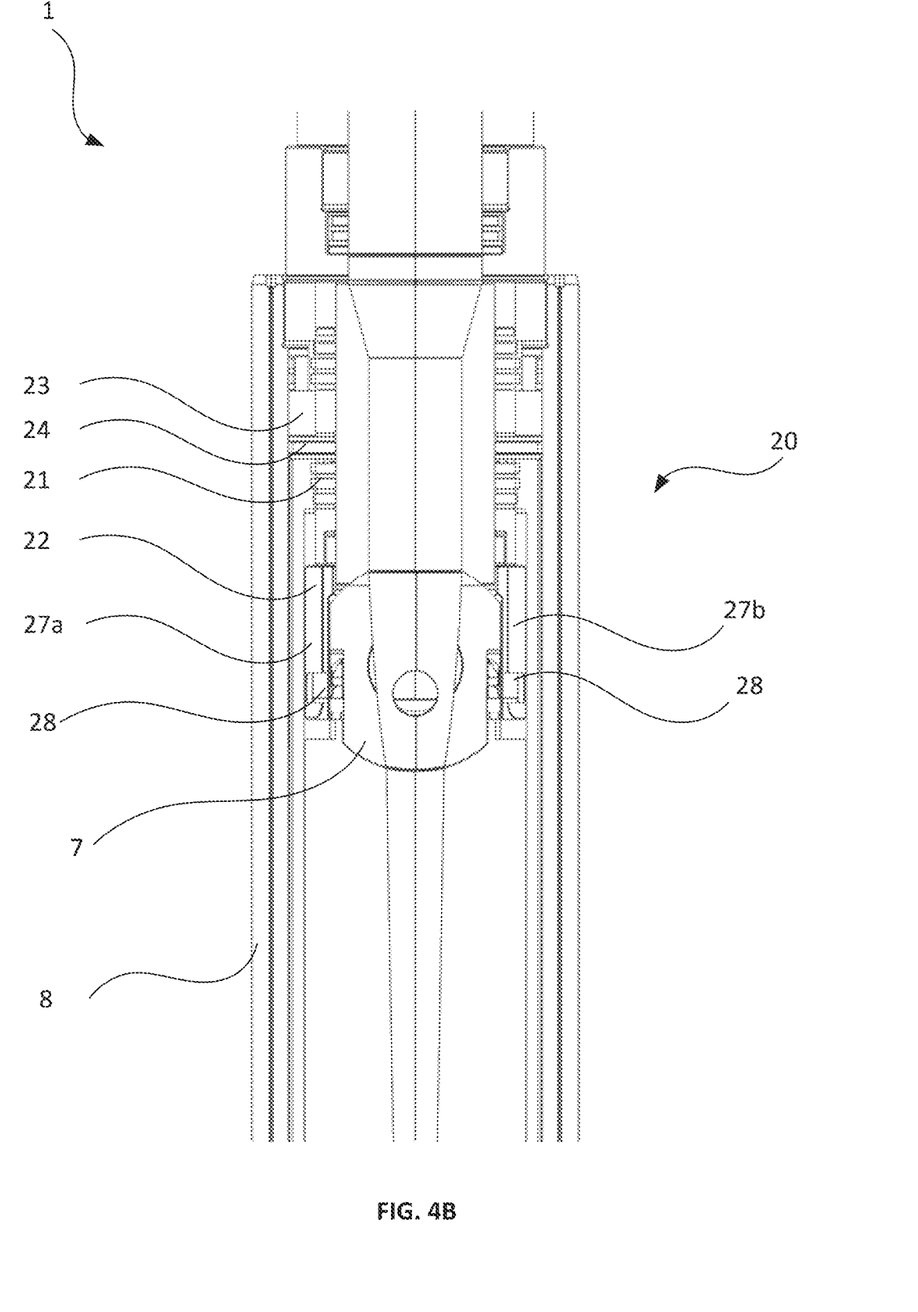

FIGS. 4A to 4D illustrate an actuator 20 of the bore selector 1 provided to rotate the ball element 7 within the housing 8. In particular, the actuator 20 is adapted to rotate the ball element 7 between the first and second rotational positions shown in FIGS. 1 and 2. FIGS. 4A and 4B show perpendicular sectional views of the actuator 20, with FIG. 4A showing the section view in the plane of the first and second passages 17, 18 and FIG. 4B showing the view in a plane perpendicular to the first and second passages 17, 18.

Figure 4C:
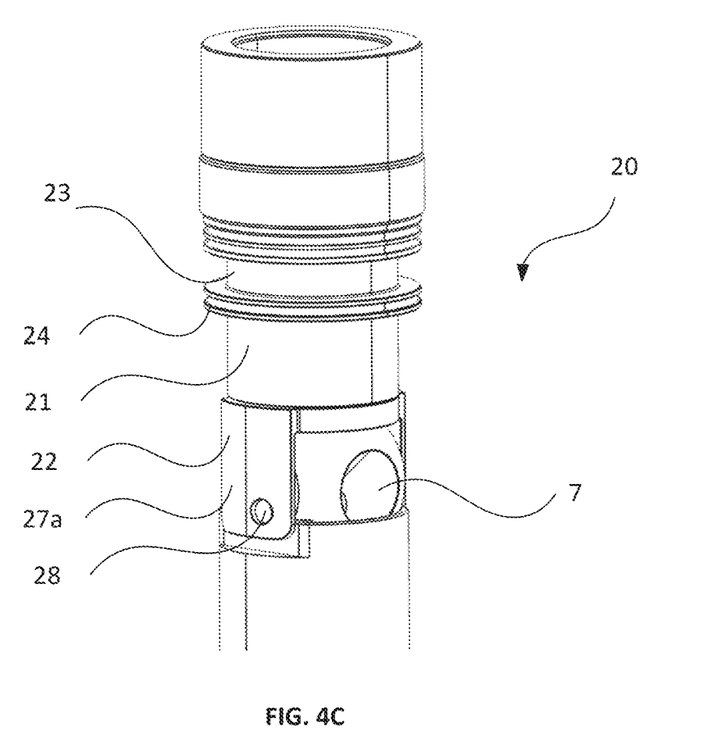
FIG. 4C shows an enlarged view of the piston of the actuator of FIGS. 4A-4B.

As shown in FIGS. 4A to 4C, the actuator 20 comprises a piston 21 and a yoke 22 that extends from the piston 21. The piston 21 is located within a chamber 23 formed within the housing 8 and is moveable in the longitudinal direction by hydraulic action. In particular, the chamber 23 is defined within the housing 8 and the piston 21 comprises a piston shoulder 24 located within the chamber 23. Movement of the piston 21 in the longitudinal direction can be provided by routing hydraulic pressure into the chamber 23 on one side of the piston shoulder 24, and the opposite movement of the piston 21 in the longitudinal direction can be provided by routing hydraulic pressure into the chamber 23 on the opposite side of the piston shoulder 24.

Figure 4D:
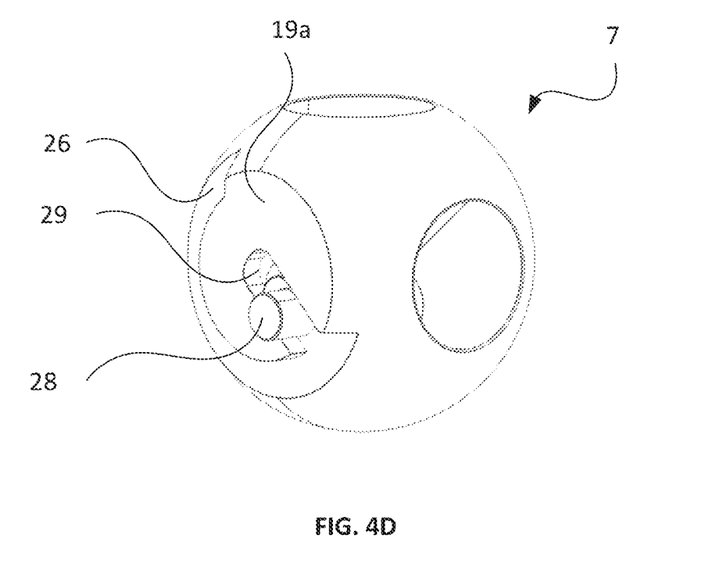
FIG. 4D shows a view of the bore selector element of FIG. 4C in isolation.

As shown most clearly in FIGS. 4B and 4D, the flattened sides 19a, 19b of the ball element 7 include a bearing surface for rotationally coupling the ball element 7 to the housing 8. In particular, each flattened 19a, 19b side of the ball element 7 has a bearing groove 26, as shown, and one or more ball bearings are trapped between the ball element 7 and the housing 8, within the bearing groove 26. Accordingly, the ball element 7 is rotatably coupled to the housing 8.

As shown most clearly in FIGS. 4B, 4C and 4D, the yoke 22 comprises a pair of arms 27a, 27b that extend from the yoke 22 on opposing sides of the ball element 7. Each arm 27a, 27b is connected to the ball element 7 by a pin 28 that engages a slot 29 in the flattened side 19a, 19b of the ball element 7. As shown in FIG. 4C, the pins 28 are offset from the centre of the ball element 7 such that movement of the piston 21 and yoke 22 in the longitudinal direction causes the pin 28 to slide along the slot 29 and rotate the ball element 7. The mechanism comprising the yoke 22, pins 28 and slots 29 may be called a scotch-yoke mechanism.

The piston 21 and chamber 23 are configured such that when the piston shoulder 24 is at a first end of the chamber 23, as shown in FIGS. 4A and 4B, the ball element 7 is in a first position corresponding to selection of the production valve. Similarly, when the piston shoulder 24 is at a second end of the chamber 23 the ball element 7 is in a second position corresponding to selection of the annulus valve.

As shown, the actuator 20 is entirely disposed within the housing 8 such that the housing 8 defines the outermost limit of the bore selector 1.

In examples, the actuator 20 is pressure-balanced. Specifically, the piston 21 may be pressure balanced because the sealing diameters/areas on the upper and lower ends of the piston 21 are the same size. Accordingly, any bore pressure acting on either end of the piston 21 generates equal forces. The pressure-balanced actuator is therefore not influenced by applied bore pressure. Advantageously, using a pressure-balanced actuator means that should control of the bore selector 1 be lost, the ball element 7 will fail in position. In an alternative example, the piston 21 may be spring-loaded to fail safe to a pre-defined bore position, for example in the position providing access to the production bore 3 or annulus bore 4.

In alternative examples the actuator 20 may comprise an electric actuator, for example an electric motor arranged to rotate the ball element 7. For example, the electric motor may be located within the housing 8 to engage the ball element 7 directly or via gearing. In other examples, an electric linear actuator may be provided with the above-described scotch-yoke mechanism to rotate the ball element 7. In some examples, the ball element 7 may be rotatable by an ROV, for example by providing an ROV handle on the housing 8.

Figure 5A:
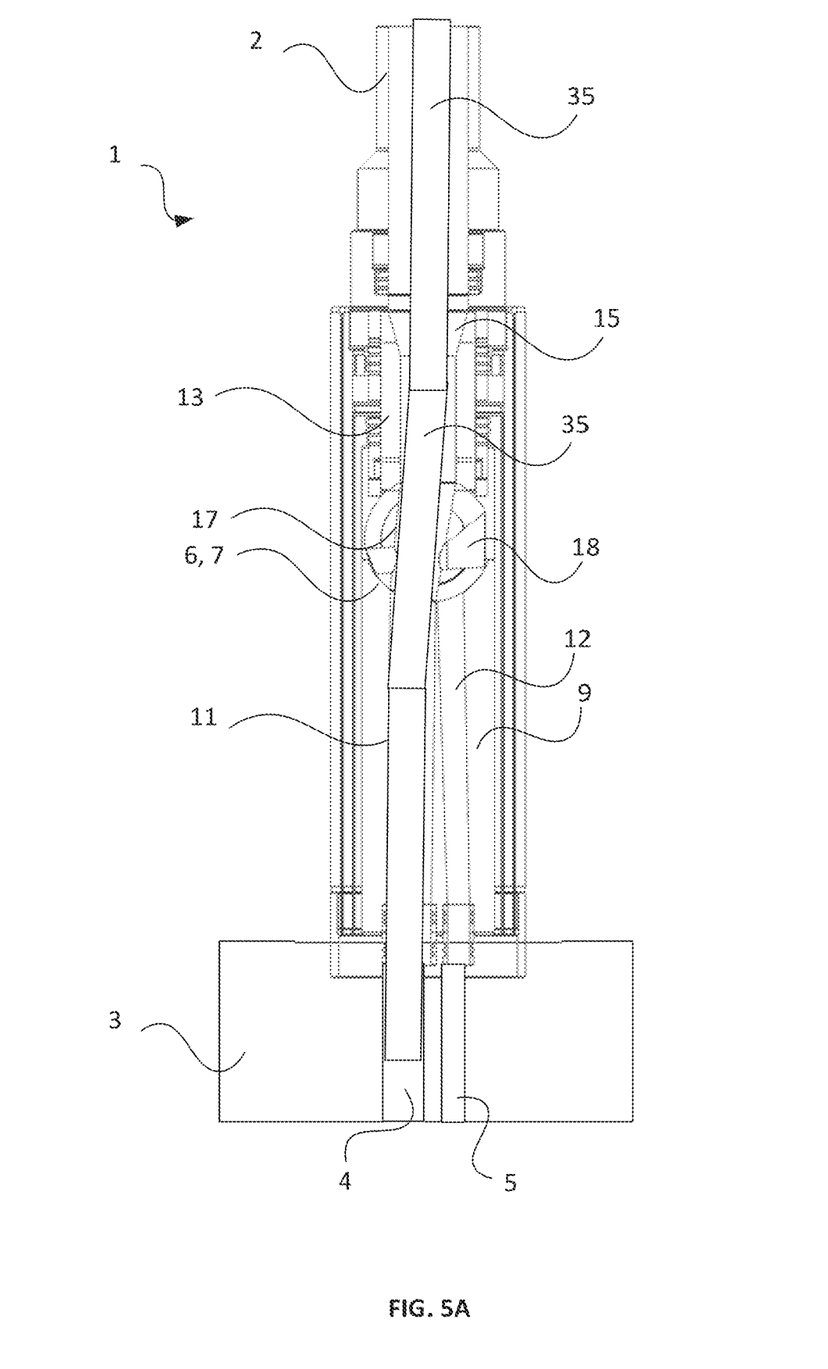
FIGS. 5A and 5B show tooling being passed through the bore selector.
Figure 5B:
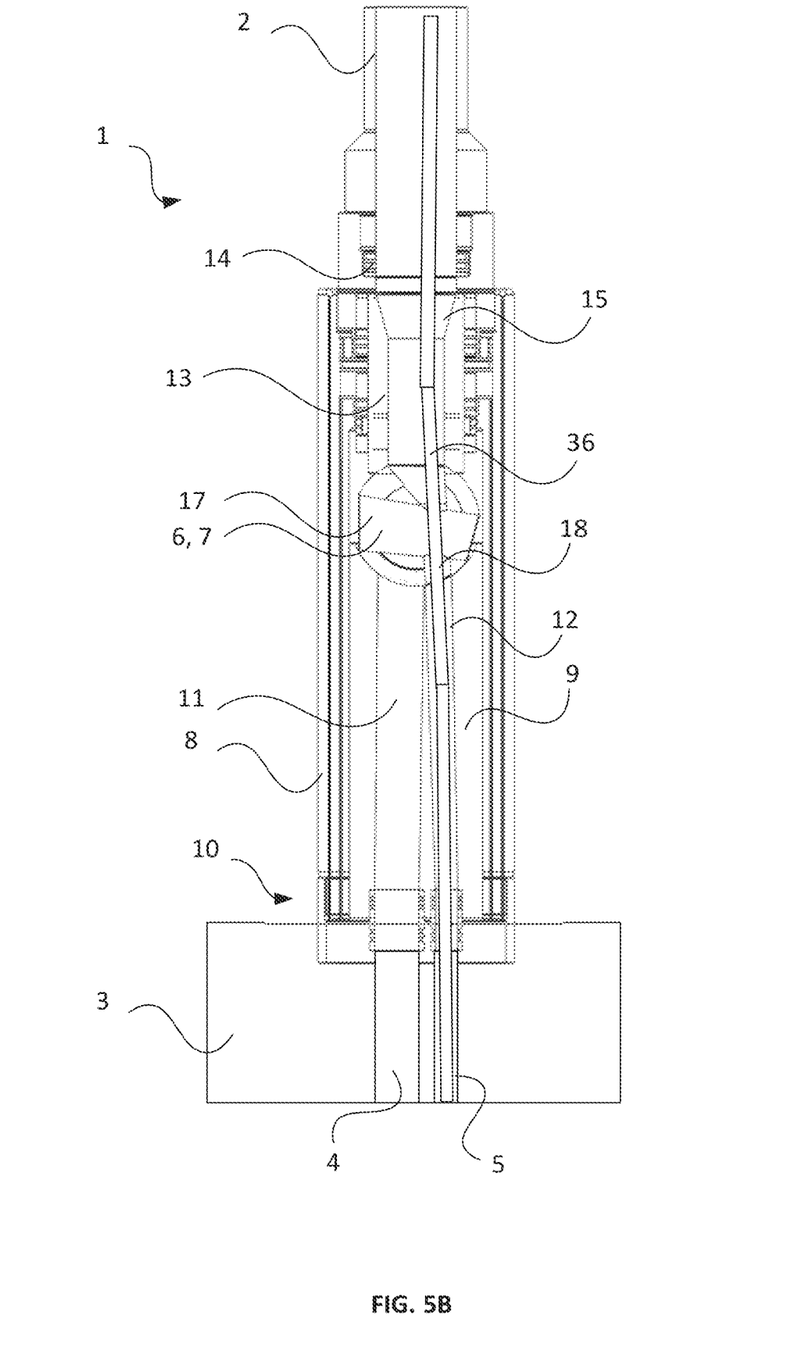

FIGS. 5A and 5B show tooling 35 being passed through a bore selector 1. In FIG. 5A the production bore 4 is selected using the ball element 7 described above. As shown, a tool 35 is maneuvered into the production bore 4 through the bore selector device 1. The tool 35 passes through the monobore riser 2, through the monobore adapter 13, through the first passage 17 of the ball element 7, through the production bore passage 11 of the bore isolator 9 and in the production bore 4. In FIG. 5B a different tool 36 is maneuvered into the annulus bore 5 by the bore selector device 1. The tool 36 passes through the monobore riser 2, through the monobore adapter 13, through the second passage 18 of the ball element 7, through the annulus bore passage 12 of the bore isolator 9 and in the annulus bore 5. As shown, the tools 35, 36 kick over within the monobore riser 2 to align with the respective first or second passage 17, 18 in the ball element 7. Accordingly, the passage 15 of the monobore adapter 13 is sized to accommodate the kick-over angle required to allow the straight sections of the toolstring to pass through the bore selector into the selected bore beneath. The first and second passages 17, 18 of the ball element 7 may be shaped to deflect the tool from a centre of the monobore adapter 13 (and monobore riser 2 above) to guide the tool 35, 36 through the first or second passage 17, 18. In particular, the first and second passages 17, 18 may be funnel-shaped at the side that aligns with the monobore adapter 13.

Figure 6:
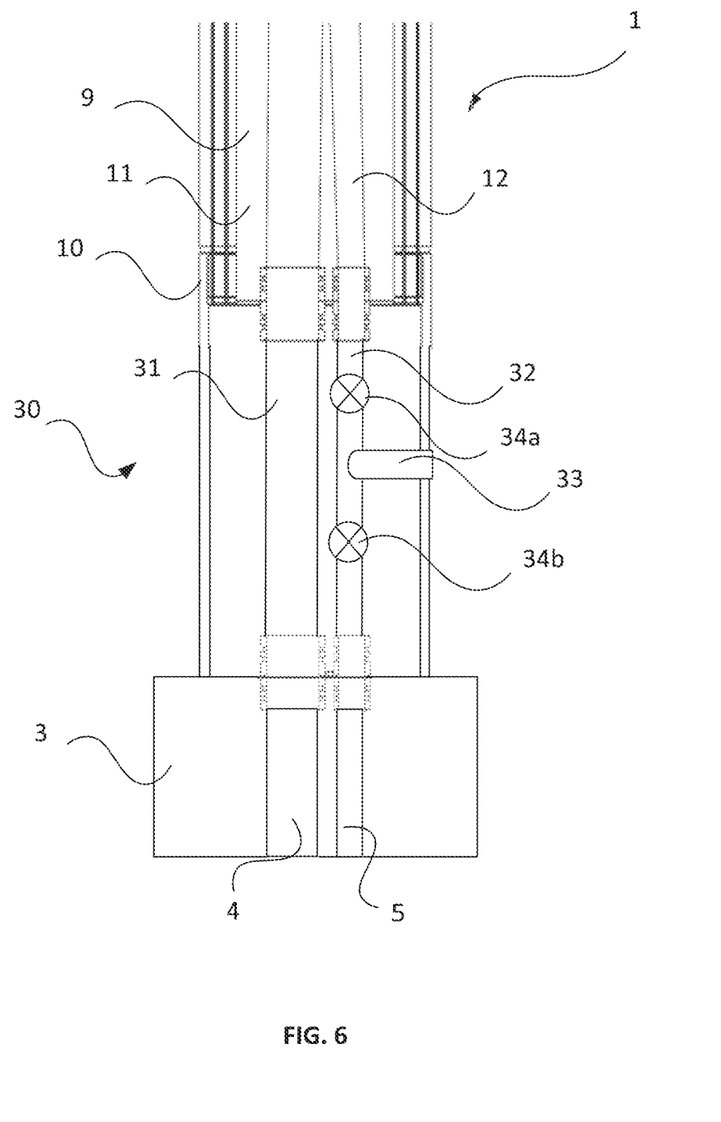
FIG. 6 shows the bore selector with an attached circulation sub-assembly.

FIG. 6 shows the bore selector 1 with a circulation sub-assembly 30 attached thereto. The circulation sub-assembly 30 is attached at the connector 10 and so sits in between the bore selector 1 and the multi-bore well system 3. The circulation sub-assembly comprises a production bore passage 31 and an annulus bore passage 32 that connect to the production bore passage 11 and annulus bore passage 12 of the bore isolator 9, respectively. The production bore passage 31 and annulus bore passage 32 also connect to the production bore 4 and annulus bore 5 of the multi-bore well system 3, as illustrated. In this example, the annulus bore passage 32 of the circulation sub-assembly 30 includes a bypass 33 for accessing the annulus bore 5 below the bore selector 1. Valves 34a, 34b are provided to control flow through the annulus bore passage 32. A further valve can be located in the bypass 33 for control of fluid through the bypass 33. In examples, the production bore passage 31 may additionally or alternatively comprise a bypass and valves in the same arrangement as the annulus bore passage 32. The bypass 33 may be connected to the surface. The circulation sub-assembly 30 may be configured with plug profiles or valves to enable isolation of either bore, to suit operational requirements (e.g. well circulation, cementing, etc).

As described above, the bore selector 1 comprises a ball element 7 acting as the bore selector element 6. An advantage of using a ball element is that the bore selector 1 is compact in height and maintains an outside diameter smaller than a typical marine riser or blowout preventer inside diameter. This means that the bore selector 1 can be deployed within a riser and/or blowout preventer.

Figure 7:
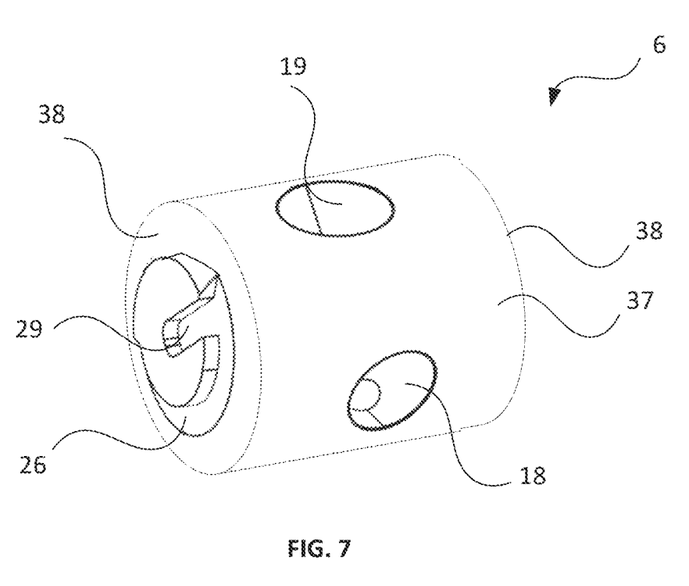
FIG. 7 shows a cylindrical bore selector element or use in the bore selector.

FIG. 7 shows an alternative bore selector element 6. The bore selector element 6 may be used in place of the ball element 7 described with reference to FIGS. 1 to 6. The bore selector element 6 of FIG. 7 is a cylindrical element 37 through which the first passage 17 and second passage 18 extend in the same manner as with the ball element 7 described above. Ends 38 of the cylindrical element 37 include the slot 29 and bearing groove 26 for rotationally mounting the cylindrical element 37 within the housing (8, see FIG. 1) and for engagement with the actuator (20, see FIG. 4A). The monobore adapter 13 and the bore isolator 9 define two parts of a seat shaped to match the cylindrical element 37. The cylindrical element 37 is rotatable about an axis substantially perpendicular to the longitudinal direction of the housing 8. In this way the cylindrical element 37 is operated in the same manner as the ball element 17 described above.

In examples, the length of the bore selector 1, in particular the housing 8, is about 65 inches (1.65 m). In examples, the outer diameter of the housing 8 is about 18.5 inches (0.47 m). Preferably, the outer surface of the housing 8 is the outermost part of the bore selector 1. The size of the bore selector 1, in particular the outer diameter of the housing 8, allows the bore selector 1 to be used within a riser system or blow out preventer.

The bore isolator 9 is separable from the bore selector 1. Accordingly, the bore isolator 9 can be changed to suit different multi-bore well systems 3, for example to match the bore size and/or spacing of the multi-bore well system 3. The bore selector element 6 and monobore adapter 13 can similarly be changed, if required. Accordingly, the bore selector 1 can easily and simply be adapted for different multi-bore well systems 3 without the need to replace the entire bore selector 1.

In examples, the bore selector element 6, specifically the ball element 7 or cylindrical element 37, may be configured to cut intervention media (e.g., wireline and/or slickline or coiled tubing) present in the bore selector 1 when the bore selector element 6 is rotated. That is, rotation of the bore selector element 6 may shear intervention media between the first or second passage 17, 18 and the monobore adapter 13 and/or the bore isolator 9. Advantageously, the bore selector 9 may therefore act as a safety isolator and may remove the need for a separate cutting device in the riser system.

The bore selector 1 described above may be connected to various other subsea equipment and so has versatile uses. In one example, the bore selector 1 may be provided as a part of a well intervention or Plug and Abandonment (P&A) apparatus. In examples, the bore selector 1 may be attached directly to the multi-bore well system 3 with one or more well barriers connected above, or below, the bore selector 1. In one example configuration the bore selector 1 is provided with the circulation sub-assembly 30 shown in FIG. 6 connected between the bore selector 1 and the multi-bore well system 3.

All of the features disclosed in this specification (including any accompanying claims, abstract and drawings), and/or all of the steps of any method or process so disclosed, may be combined in any combination, except combinations where at least some of such features and/or steps are mutually exclusive. The applicant indicates that aspects of the present disclosure may consist of any such individual feature or combination of features. It should be understood that the embodiments described herein are merely exemplary and that various modifications may be made thereto without departing from the scope of the disclosure.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A bore selector for use with a monobore riser and a multi-bore subsea system having a production bore and an annulus bore, the bore selector comprising:
    a housing extending in a longitudinal direction;
    a bore selector element rotatably mounted to the housing and rotatable about an axis extending substantially transverse to the longitudinal direction, the bore selector element comprising:
        a first passage extending through the bore selector element and configured to connect the monobore riser to the production bore at a first rotational position of the bore selector element, and
        a second passage extending through the bore selector element and configured to connect the monobore riser to the annulus bore at a second rotational position of the bore selector element;
    a first connector for connection to the monobore riser; and
    a monobore adapter disposed between the bore selector element and the first connector,
    wherein the monobore adapter defines a portion of a seat within which the bore selector element is rotatable, and
    wherein rotation of the bore selector element is configured to shear a wireline medium between the bore selector element and the monobore adapter and/or a bore isolator.

2. The bore selector of claim 1, wherein each of the first passage and the second passage has a first opening and a second opening formed in a surface of the bore selector element.

3. The bore selector of claim 1, wherein the first and second passages intersect within the bore selector element.

4. The bore selector of claim 1, further comprising a second connector for connection to the multi-bore subsea system, wherein the bore isolator is disposed between the bore selector element and the second connector.

5. The bore selector of claim 4, wherein the bore isolator comprises a production bore passage for connection to the production bore, and an annulus bore passage for connection to the annulus bore.

6. The bore selector of claim 5, wherein the production bore passage and the annulus bore passage are separate.

7. The bore selector of claim 4, wherein the bore isolator is exchangeable such that the bore selector can be configured for different multi-bore subsea systems.

8. The bore selector of claim 4, wherein the bore isolator defines a portion of a seat within which the bore selector element is rotatable.

9. The bore selector of claim 1, wherein the bore selector element comprises a ball element.

10. The bore selector of claim 1, wherein the bore selector element comprises a cylindrical element.

11. The bore selector of claim 1, further comprising an actuator configured to rotate the bore selector element.

12. The bore selector of claim 11, wherein the actuator comprises a scotch-yoke mechanism.

13. The bore selector of claim 12, wherein the actuator comprises a hydraulic piston.

14. The bore selector of claim 11, wherein the actuator is pressure balanced.

15. The bore selector of claim 1, further comprising a circulation sub-assembly connectable between the bore selector element and the multi-bore subsea system.

16. The bore selector of claim 1, wherein the housing defines an outermost surface of the bore selector, and wherein the housing is adapted to fit within the monobore riser.

17. The bore selector of claim 1, wherein an outer diameter of the housing is at most 18.5 inches (0.47 m).

18. Apparatus for connection to a subsea well, the apparatus comprising a monobore riser system comprising a monobore riser, and a bore selector according to claim 1.

19. The apparatus of claim 18, wherein the bore selector is received within the monobore riser system.

20. The apparatus of claim 18, wherein the apparatus is a well intervention apparatus.

21. The apparatus of claim 18, wherein the apparatus is a well plug and abandonment apparatus.

22. The apparatus of claim 18, wherein the apparatus is a well installation apparatus.

23. A bore selector for use with a monobore riser and a multi-bore subsea system having a production bore and an annulus bore, the bore selector comprising:
    a housing extending in a longitudinal direction;
    a bore selector element rotatably mounted to the housing and rotatable about an axis extending substantially transverse to the longitudinal direction, the bore selector element comprising:
        a first passage extending through the bore selector element and configured to connect the monobore riser to the production bore at a first rotational position of the bore selector element, and a second passage extending through the bore selector element and configured to connect the monobore riser to the annulus bore at a second rotational position of the bore selector element; and an actuator configured to rotate the bore selector element, wherein the actuator comprises a scotch-yoke mechanism.

24. A bore selector for use with a monobore riser and a multi-bore subsea system having a production bore and an annulus bore, the bore selector comprising:

a housing extending in a longitudinal direction;

a bore selector element rotatably mounted to the housing and rotatable about an axis extending substantially transverse to the longitudinal direction, the bore selector element comprising:
- a first passage extending through the bore selector element and configured to connect the monobore riser to the production bore at a first rotational position of the bore selector element, and
- a second passage extending through the bore selector element and configured to connect the monobore riser to the annulus bore at a second rotational position of the bore selector element; and a circulation sub-assembly connectable between the bore selector element and the multi- bore subsea system.

25. The bore selector of claim 24, wherein the housing defines an outermost surface of the bore selector, and wherein the housing is adapted to fit within the monobore riser.

* * * * *